US012561884B2

(12) United States Patent 
Wang

(10) Patent No.: US 12,561,884 B2 
(45) Date of Patent: Feb. 24, 2026

(54) PATTERN-GUIDED COORDINATE MAPPING FOR DIGITAL IMAGE RETEXTURING

(71) Applicant: Adobe Inc., San Jose, CA (US)

(72) Inventor: Yangtuanfeng Wang, London (GB)

(73) Assignee: Adobe Inc., San Jose, CA (US)

( * ) Notice: Subject to any disclaimer, the term of this patent is extended or adjusted under 35 U.S.C. 154(b) by 263 days.

(21) Appl. No.: 18/238,719

(22) Filed: Aug. 28, 2023

(65) Prior Publication Data

US 2025/0078386 A1 Mar. 6, 2025

(51) Int. Cl. 
G06T 15/04 (2011.01) 
G06T 7/194 (2017.01) 
G06T 7/73 (2017.01)

(52) U.S. Cl. 
CPC .............. G06T 15/04 (2013.01); G06T 7/194 (2017.01); G06T 7/73 (2017.01); G06T 2200/24 (2013.01); G06T 2207/10016 (2013.01); G06T 2210/16 (2013.01)

(58) Field of Classification Search 
None 
See application file for complete search history.

(56) References Cited

U.S. PATENT DOCUMENTS

| 5,034,986 A | * | 7/1991 | Karmann | G06V 10/28 |
| | | | | 348/169 |
| 6,850,243 B1 | * | 2/2005 | Kilgariff | G06T 15/04 |
| | | | | 345/581 |

| 2009/0028432 A1 | * | 1/2009 | Rossato | G06T 7/194 |
| | | | | 382/173 |
| 2016/0037087 A1 | * | 2/2016 | Price | G06T 7/194 |
| | | | | 348/586 |
| 2017/0053431 A1 | * | 2/2017 | Grenfell | G06T 15/04 |
| 2019/0057507 A1 | * | 2/2019 | El-Khamy | G06T 11/60 |
| 2020/0250428 A1 | * | 8/2020 | Ahmed | G06V 20/13 |
| 2021/0295606 A1 | * | 9/2021 | Kim | G06T 17/20 |
| 2021/0334935 A1 | * | 10/2021 | Grigoriev | G06T 5/77 |

(Continued)

OTHER PUBLICATIONS

"3DPeople", 3DPeople [retrieved Mar. 9, 2023]. Retrieved from the Internet <https://3dpeople.com/en/>., 7 Pages.

(Continued)

*Primary Examiner* — Jason A Pringle-Parker 
(74) *Attorney, Agent, or Firm* — FIG. 1 Patents

(57) ABSTRACT

Retexturing items depicted in digital image data is described. An image retexturing system receives image data that depicts an item featuring a pattern. The image retexturing system identifies coarse correspondences between regions in the image data and a two-dimensional image of the pattern. Using the coarse correspondences, the image retexturing system establishes, for each pixel in the image data depicting the item, a pair of coordinates for a surface of the item featuring the pattern. The coordinate pairs are then used to generate a mesh that represents the surface of the item. The image retexturing system then applies a new texture to a surface of the item by mapping the new texture to a surface of the mesh. A shading layer and item mask are generated for the image data, which are combined with the retextured mask to generate a synthesized image that depicts the retextured item.

20 Claims, 9 Drawing Sheets 
(4 of 9 Drawing Sheet(s) Filed in Color)

(56)                    References Cited

U.S. PATENT DOCUMENTS

| 2022/0198738 | A1* | 6/2022 | Xu | G06T 17/00 |
|---|---|---|---|---|
| 2022/0292680 | A1* | 9/2022 | Hsu | G06V 10/25 |
| 2022/0292715 | A1* | 9/2022 | Liu | G06T 7/73 |
| 2022/0383582 | A1* | 12/2022 | Chen | G06T 15/06 |
| 2023/0037591 | A1* | 2/2023 | Villegas | G06T 7/70 |
| 2023/0252692 | A1* | 8/2023 | Liu | G06T 3/18 |
| | | | | 345/582 |
| 2025/0078386 | A1* | 3/2025 | Wang | G06T 11/00 |

OTHER PUBLICATIONS

"Clo digital fashion store", Connect [retrieved Mar. 9, 2023]. Retrieved from the Internet <https://connect.clo-set.com/store>., 1 Page.

"Fabric Printing Prices", Digital Fabrics [retrieved Mar. 9, 2023]. Retrieved from the Internet <https://www.digitalfabrics.com.au/fabric-printing-prices/>., 4 Pages.

"Jacobian matrix and determinant", Wikipedia, the free encyclopedia [retrieved Mar. 9, 2023]. Retrieved from the Internet <https://en.wikipedia.org/wiki/Jacobian_matrix_and_determinant>., 8 Pages.

"Poly Haven", Poly Haven [retrieved Mar. 9, 2023]. Retrieved from the Internet <https://polyhaven.com>., 12 Pages.

"Semi-Cutaway Collar Non-Iron Decorative Print Shirt—Olive Green", Charles Tyrwhitt Shirts Ltd. [retrieved Mar. 9, 2023]. Retrieved from the Internet <https://www.charlestyrwhitt.com/uk/semi-cutaway-collar-non-iron-decorative- print-shirt---olive-green/CSB0069OLV.html>., 16 Pages.

Albahar, Badour , et al., "Pose with Style: Detail-Preserving Pose-Guided Image Synthesis with Conditional StyleGAN", Cornell University arXiv, arXiv.org [retrieved Aug. 9, 2023]. Retrieved from the Internet <https://arxiv.org/pdf/2109.06166.pdf>., Aug. 10, 2022, 11 Pages.

Bell, Sean , et al., "Intrinsic images in the wild", ACM Transactions on Graphics, vol. 33, No. 4 [retrieved Mar. 9, 2023]. Retrieved from the Internet <http://labelmaterial.s3.amazonaws.com/release/siggraph2014-intrinsic.pdf>., Jul. 27, 2014, 12 Pages.

Chen, Huaijin , "Reblur2Deblur: Deblurring Videos via Self-Supervised Learning", Cornell University arXiv, arXiv.org [retrieved Mar. 9, 2023]. Retrieved from the Internet <https://arxiv.org/pdf/1801.05117.pdf>., Jan. 16, 2018, 8 Pages.

Güler, RiZa Alp, et al., "DensePose: Dense Human Pose Estimation in the Wild", Cornell University, arXiv Preprint, arxiv.org [retrieved Mar. 9, 2023]. Retrieved from the Internet <https://arxiv.org/pdf/1802.00434.pdf>., Feb. 2018, 12 Pages.

Gundogdu, Erhan , et al., "GarNet: A Two-Stream Network for Fast and Accurate 3D Cloth Draping", Cornell University arXiv, arXiv.org [retrieved Mar. 9, 2023]. Retrieved from the Internet <https://arxiv.org/pdf/1811.10983.pdf>., Aug. 21, 2019, 10 Pages.

Guskov, Igor , et al., "Trackable surfaces", SCA '03: Proceedings of the 2003 ACM SIGGRAPH/Eurographics symposium on Computer animation [retrieved Mar. 9, 2023]. Retrieved from the Internet <https://citeseerx.ist.psu.edu/document?repid=rep1&type=pdf&doi=6a4ae62a6612a99fdad1fb050cbb175dfee561a0>., Jul. 26, 2003, 8 Pages.

Halimi, Oshri , et al., "Garment Avatars: Realistic Cloth Driving using Pattern Registration", Cornell University arXiv, arXiv.org [retrieved Mar. 9, 2023]. Retrieved from the Internet <https://arxiv.org/pdf/2206.03373.pdf>., Jul. 7, 2022, 16 Pages.

Horé, Alain , et al., "Image quality metrics: Psnr vs. ssim", 2010 International Conference on Pattern Recognition [retrieved Mar. 9, 2023]. Retrieved from the Internet <https://ieeexplore.ieee.org/abstract/document/5596999>., Aug. 2010, 4 Pages.

Ianina, Anastasia , et al., "BodyMap: Learning Full-Body Dense Correspondence Map", Cornell University arXiv, arXiv.org [retrieved Aug. 9, 2023]. Retrieved from the Internet <https://arxiv.org/pdf/2205.09111.pdf>., Jun. 2022, 15 Pages.

Jiang, Shihao , et al., "Learning Optical Flow from a Few Matches", Cornell University arXiv, arXiv.org [retrieved Mar. 9, 2023]. Retrieved from the Internet <https://arxiv.org/pdf/2104.02166.pdf>., Apr. 5, 2021, 10 Pages.

Kasten, Yoni , et al., "Layered Neural Atlases for Consistent Video Editing", Cornell University arXiv, arXiv.org [retrieved Aug. 9, 2023]. Retrieved from the Internet <https://arxiv.org/pdf/2109.11418.pdf>., Sep. 23, 2021, 12 Pages.

Li, Minchen , et al., "Codimensional Incremental Potential Contact", Cornell University arXiv, arXiv.org [retrieved Mar. 9, 2023]. Retrieved from the Internet <https://arxiv.org/pdf/2012.04457.pdf>., May 5, 2021, 29 Pages.

Liu, Peidong , et al., "Self-Supervised Linear Motion Deblurring", Cornell University arXiv, arXiv.org [retrieved Mar. 9, 2023]. Retrieved from the Internet <https://arxiv.org/pdf/2002.04070.pdf>., Feb. 10, 2020, 23 Pages.

Narita, Gaku , et al., "Dynamic projection mapping onto deforming non-rigid surface using deformable dot cluster marker", IEEE Transactions on Visualization and Computer Graphics, vol. 23, No. 3 [retrieved Mar. 9, 2023]. Retrieved from the Internet <https://ieeexplore.ieee.org/abstract/document/7516689>., Jun. 19, 2016, 14 Pages.

Neverova, Natalia, et al., "Continuous Surface Embeddings", Cornell University arXiv, arXiv.org [retrieved Aug. 9, 2023]. Retrieved from the Internet <https://arxiv.org/pdf/2011.12438.pdf>., Nov. 24, 2020, 15 Pages.

Patel, Chaitanya , et al., "TailorNet: Predicting Clothing in 3D as a Function of Human Pose, Shape and Garment Style", IEEE/CVF Conference on Computer Vision and Pattern Recognition [retrieved Mar. 9, 2023]. Retrieved from the Internet <https://arxiv.org/pdf/2003.04583.pdf>., Jun. 2020, 11 Pages.

Ronneberger, Olaf , et al., "U-Net: Convolutional Networks for Biomedical Image Segmentation", Cornell University arXiv, arXiv.org [retrieved Mar. 16, 2023]. Retrieved from the Internet <https://arxiv.org/pdf/1505.04597.pdf>., May 18, 2015, 8 pages.

Santesteban, Igor , et al., "Learning-Based Animation of Clothing for Virtual Try-On", Cornell University arXiv, arXiv.org [retrieved Mar. 9, 2023]. Retrieved from the Internet <https://arxiv.org/pdf/1903.07190.pdf>., Mar. 17, 2019, 12 Pages.

Santesteban, Igor , et al., "Self-Supervised Collision Handling via Generative 3D Garment Models for Virtual Try-On", Cornell University arXiv, arXiv.org [retrieved Aug. 9, 2023]. Retrieved from the Internet <https://arxiv.org/pdf/2105.06462.pdf>., May 13, 2021, 11 Pages.

Sarkar, Kripasindhu , "Humangan: A generative model of human images", Cornell University arXiv, arXiv.org [retrieved Mar. 9, 2023]. Retrieved from the Internet <https://arxiv.org/pdf/2103.06902.pdf>., Mar. 11, 2021, 21 Pages.

Scholz, Volker , et al., "Garment Motion Capture Using Color-Coded Patterns", [retrieved Mar. 9, 2023]. Retrieved from the Internet <https://citeseerx.ist.psu.edu/document?repid=rep1&type=pdf&doi=90e331cce861419bbb12b67a3aa1b50f862bf03f>., Jul. 31, 2005, 9 Pages.

Tan, Feitong , et al., "HumanGPS: Geodesic PreServing Feature for Dense Human Correspondences", Cornell University arXiv, arXiv.org [retrieved Aug. 9, 2023]. Retrieved from the Internet <https://arxiv.org/pdf/2103.15573.pdf>., Mar. 29, 2021, 22 Pages.

Tancik, Matthew , et al., "Fourier Features Let Networks Learn High Frequency Functions in Low Dimensional Domains", Cornell University arXiv, arXiv.org [retrieved Aug. 9, 2023]. Retrieved from the Internet <https://arxiv.org/pdf/2006.10739.pdf>., Jun. 18, 2020, 24 Pages.

Teed, Zachary , et al., "RAFT: Recurrent All-Pairs Field Transforms for Optical Flow", Cornell University arXiv, arXiv.org [retrieved Mar. 9, 2023]. Retrieved from the Internet <https://arxiv.org/pdf/2003.12039.pdf>., Aug. 25, 2020, 21 Pages.

Wang, Tuanfeng , et al., "Learning an intrinsic garment space for interactive authoring of garment animation", ACM Transactions on Graphics, vol. 38, No. 6 [retrieved Mar. 9, 2023]. Retrieved from the Internet <https://web.archive.org/web/20201107180747id_/https://discovery.ucl.ac.uk/id/eprint/10092084/1/paper_Tuanfeng_GarmentAnimation_author. pdf>., Nov. 8, 2019, 12 Pages.

(56) References Cited

OTHER PUBLICATIONS

Xie, You , et al., "TemporalUV: Capturing Loose Clothing with Temporally Coherent UV Coordinates", Cornell University arXiv, arXiv.org [retrieved Aug. 9, 2023]. Retrieved from the Internet <https://arxiv.org/pdf/2204.03671.pdf>., Apr. 2022, 16 Pages.

Yan, Haonan , et al., "UltraPose: Synthesizing Dense Pose with 1 Billion Points by Human-body Decoupling 3D Model", Cornell University arXiv, arXiv.org [retrieved Aug. 9, 2023]. Retrieved from the Internet <https://arxiv.org/pdf/2110.15267.pdf>., Oct. 2021, 10 Pages.

Ye, Vickie , et al., "Deformable Sprites for Unsupervised Video Decomposition", Cornell University arXiv, arXiv.org [retrieved Aug. 9, 2023]. Retrieved from the Internet <https://arxiv.org/pdf/2204.07151.pdf>., Apr. 14, 2022, 10 Pages.

Zhang, Richard , et al., "The Unreasonable Effectiveness of Deep Features as a Perceptual Metric", Cornell University arXiv, arXiv.org [retrieved Aug. 11, 2023]. Retrieved from the Internet <https://arxiv.org/pdf/1801.03924.pdf>., Apr. 10, 2018, 14 Pages.

* cited by examiner

200

Input Image 110

Item 112

Pattern 114

Image Composition Model 106

Correspondence Module 202

Pixel Correspondences 204

Regression Module 206

UV Coordinates 208

Decomposition Module 210

Masking Model 212

Item Mask 216

Shading Model 214

Shading Layer 218

Texture(s) 124

Composition Module 220

Synthesized Image 108

Item 112

Texture(s) 124

300

400

500
*Fig. 5*

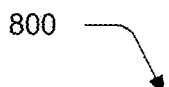

800

<u>802</u>
Receive digital image data depicting at least one item featuring a pattern <u>804</u>
Generate a coordinate map for the at least one item based on the pattern <u>806</u>
Generate an item mask that segments the at least one item from at least one other portion of the image data <u>808</u>
Generate a shading layer for the at least one item <u>810</u>
Receive at least one texture to be applied to the at least one item <u>812</u>
Generate synthesized image data that depicts the at least one item featuring the at least one texture using the coordinate map, the item mask, and the shading layer

Platform 916

Resources 918

Cloud
914

Computing Device 902

Processing Device 904

Hardware Elements 910

Computer-readable Media 906

Memory/ Storage 912

I/O Interfaces 908

Image Retexturing System 104

PATTERN-GUIDED COORDINATE MAPPING FOR DIGITAL IMAGE RETEXTURING

BACKGROUND

With advances in computing device technology, synthesized images of items (e.g., clothing items, home décor items, accessories, etc.) are increasingly used to preview items' appearance when featuring different textures. For example, ecommerce platforms use synthesized images to preview products for sale, with different images depicting the same item as featuring different patterns, different materials, different colors, combinations thereof, and so forth. Synthesized image generation represents a more convenient approach to previewing an item's appearance, relative to conventional approaches that require fabricating different instances of an item, where each instance features a different texture, and capturing (e.g., taking a picture, or recording a video, of) each differently textured item.

SUMMARY

Systems and techniques for retexturing items depicted in digital image data are described. An image retexturing system receives image data that depicts an item featuring a specific, known pattern that is printed onto the item (e.g., a clothing item, an accessory, household goods, and so forth). For instance, a clothing item featuring the specific pattern is fabricated and worn by a human model, and image data (e.g., a picture or a video) depicting the human model wearing the clothing item is captured. The image data depicting the item featuring the specific pattern (e.g., an image of a model wearing a dress featuring the specific pattern) is provided as input to the image retexturing system.

Using a two-dimensional image of the specific pattern, the image retexturing system identifies coarse correspondences between regions in the image data and the two-dimensional image of the pattern. From the coarse correspondences, the image retexturing system establishes per-pixel correspondences between the image data and a coordinate space, such as a UV coordinate space. In some implementations, establishing per-pixel correspondences between the image data and the coordinate space is performed using a multilayer perceptron trained to output, for each pixel in the image data depicting the specific pattern, a pair of coordinates for a surface of an item featuring the specific pattern. The coordinate pairs are then used by the image retexturing system to generate a mesh that represents the surface of the item featuring the specific pattern.

The image retexturing system additionally leverages outputs a shading layer and an item mask for the image data. The shading layer represents an amount and distribution of light falling on the surface of the item featuring the specific pattern and the item mask segments the item featuring the specific pattern from one or more other portions of the image data, such as from an image background, an image foreground, one or more other items or objects depicted in the image data, and so forth. The image retexturing system then applies one or more textures to a surface of the item by mapping the one or more textures to a surface of the mesh generated from the coordinate pairs. The retextured mask, the shading layer, and the item mask are then combined to generate a synthesized image, which depicts the item as featuring the one or more textures.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 5 depicts an example implementation of the image retexturing system of FIG. 1 generating a coordinate map for an item featuring a pattern.

FIG. 8 is a flow diagram depicting a procedure in an example implementation of generating a synthesized image featuring one or more textures using the image retexturing system of FIG. 1.

DETAILED DESCRIPTION

Overview

Figure 1:
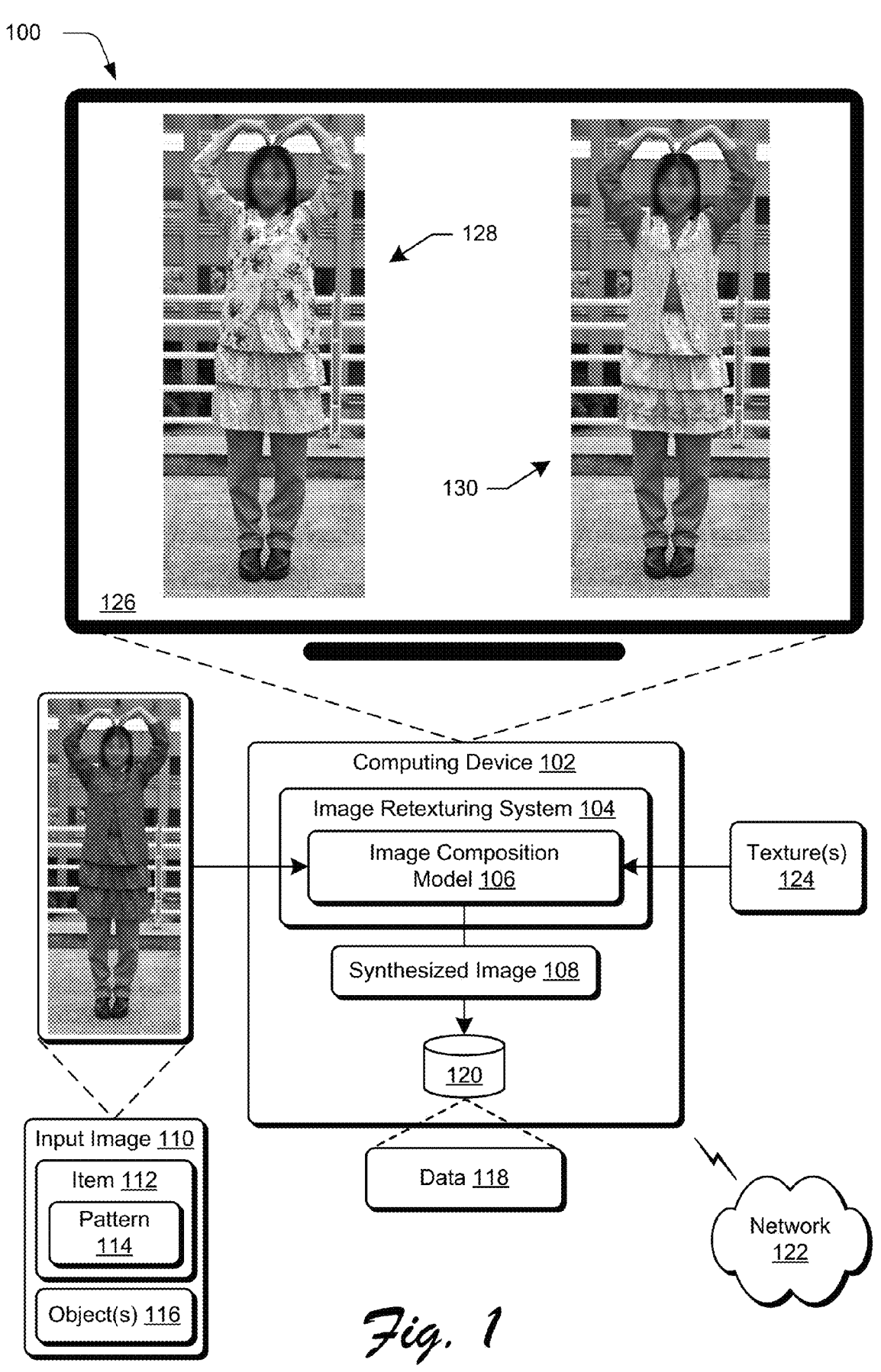
FIG. 1 is an illustration of an environment in an example implementation that is operable to employ pattern-guided coordinate mapping and digital image retexturing techniques described herein.

Synthesized images of items (e.g., clothing items, home décor items such as flooring and carpets, accessories, and so forth) are often used to preview items' appearance when featuring different textures. Synthesized image generation represent a more convenient approach to previewing an item's appearance, relative to conventional approaches that required fabricating different instances of an item, where each instance features a different texture, and capturing (e.g., taking a picture or recording a video of) each instance of the item.

In the context of synthetic image generation, "texture" refers to the visual and tactile properties of an item's surface or material that are perceived by the human eye (e.g., perceived through the sense of sight). Texture in synthetic images is digitally created by simulating the appearance of different surface characteristics, such as roughness, smoothness, patterns, and other details that are observed by the human eye. Texture plays an important role in generating realistic digital images. By accurately representing textures, synthesized images depicting items featuring various textures can mimic the look and feel of real-world materials, allowing viewers to have a better understanding and visual experience of the depicted items (e.g., relative to surrounding objects, scenes, and other aspects depicted in image data).

To generate synthetic images that depict items featuring various textures, some conventional approaches generate a three-dimensional model (e.g., a three-dimensional model of a clothing item or of a human subject on which the clothing item is to be digitally mapped). From the three-dimensional model, coordinates of a mesh defining a surface of the item (e.g., a piece of clothing, an accessory, etc.) are determined. Different textures are then attached to the mesh coordinates to visually indicate how different patterns, prints, and so forth will appear when featured on the item (e.g., how the texture will appear when printed on the clothing item). Via these conventional synthetic image generation approaches, the need for a human model to individually try on each different texture, pattern, style, or other variation of a clothing item or accessory, and to fabricate each instance of an item, is avoided.

To generate synthesized images of items featuring different textures, some conventional approaches attach an algorithmically generated texture to the three-dimensional mesh coordinates. In the process of generating synthesized images, texture is created through algorithms that simulate the visual properties of various materials. Conventional algorithms may consider factors such as color, reflectance, shading, surface patterns, and other characteristics that contribute to the overall texture of an object. For example, when generating synthetic images of clothing items, conventional texturing algorithm simulate different fabric patterns, weaves, and surface finishes to replicate the appearance of different textiles. Similarly, in other contexts like furniture, home decor, or automotive industries, conventional texture algorithms simulate materials like wood, metal, leather, or plastic, along with their unique surface properties.

Such conventional approaches of synthetically generating different textures, however, involve a technical workflow that presents numerous drawbacks. These drawbacks include requiring a human expert to manually create the three-dimensional model from which a mesh of coordinates is generated. Conventional drawbacks further include requiring a human expert to manually map different textures to the mesh, where the mapped texture/mesh is used to output a synthesized image that depicts an item featuring the mapped texture(s). Furthermore, conventional approaches to generating synthesized images of items featuring different textures are computationally intensive, requiring significant amounts of computational processing power, network bandwidth, data storage, and other computational resources.

Given the computational complexity and manual labor required to generate synthesized images of items featuring different textures, conventional approaches to generating synthetic images are cost prohibitive and inaccessible for entities that have limited resources (e.g., entrepreneurs that have limited resources to advertise how their products will appear featuring different textures). As such, entities with limited resources are forced to resort to the conventional approach of fabricating multiple instances of an item, which each feature different textures.

After fabricating the different instances of the item, the limited resource entities are required to manually capture image data (e.g., via photographing or video recording) that depicts the different instances of the textured item. However, this fabrication and manual image capturing approach presents additional obstacles, primarily by requiring the actual fabrication of each instance of the textured item. Such a conventional approach becomes particularly problematic in situations where a certain texture is misprinted or undesired by the consuming market, as the fabricating entity is forced to expend precious resources on needlessly fabricating an item.

To address these conventional problems, an image retexturing system is described. The image retexturing system leverages a design featuring a specific, known pattern that is printed onto a physical item (e.g., a clothing item, an accessory, household goods, and so forth). For instance, a clothing item featuring the specific pattern is fabricated and worn by a human model, and image data (e.g., a picture or a video) depicting the human model wearing the clothing item is captured. The image data depicting the item featuring the specific pattern (e.g., an image of a model wearing a dress featuring the specific pattern) is provided as input to the image retexturing system.

As described herein, the "specific pattern" refers to a known codec pattern of various geometries and colors that are recognizable by the image retexturing system to generate a mesh that defines a surface of an item (e.g., clothing item) when the specific pattern is featured by the item (e.g., when a shirt having the specific pattern is worn by a model). Advantageously, the image retexturing system is configured to identify a surface of the item featuring the specific pattern even when the item is disposed on an object (e.g., worn by a human model, draped over furniture, etc.) in a manner that creates heavy wrinkles in, or self-occlusion of, the specific pattern.

The image retexturing system includes a correspondence module that, using a two-dimensional image of the pattern, identifies discrete correspondences between regions (e.g., pixels) in the image data and the two-dimensional image of the pattern. Using the discrete correspondences output by the correspondence module, the image retexturing system leverages a regression module to establish per-pixel correspondences from the image space (e.g., the image data depicting the item featuring the specific pattern) to a coordinate parameterization space (e.g., a UV coordinate space). In some implementations, the regression module is configured to establish per-pixel correspondences between the image data depicting the item featuring the specific pattern using a multilayer perceptron (MLP) tasked with a regression objective. By tasking the MLP with a regression objective, the regression module causes the MLP to output, for each pixel in the image data depicting the specific pattern, coordinates (e.g., a pair of UV coordinates) for a surface of an item featuring the specific pattern.

The MLP is guided with both a data loss and a sparsity loss when establishing the per-pixel correspondences. The data loss guides the MLP to learn high frequency coordinate signals in the two-dimensional image data domain (e.g., capture edges between different regions in the specific pattern as represented by changes in color and intensity between adjacent pixels). The sparsity loss causes the MLP to account for wrinkles, self-occlusion, and other characteristics that result in a surface of the item featuring the specific pattern being unsmooth. In implementations where the image data represents a video capturing the item featuring the specific pattern, the MLP is further guided using a temporal consistency loss to ensure that sequential frames of the video depict the item featuring the specific pattern with a coherent optical flow.

The coordinates defining the surface of the item featuring the specific pattern define a mesh for the surface of the item onto which one or more different textures can be mapped. To preserve visual characteristics in the image data depicting the item featuring the specific pattern, the image retexturing system further generates a shading layer and an item mask for the image data. As described herein, a "shading layer" refers to an image layer that represents the amount and distribution of light falling on the surface of the item featuring the specific pattern. As described herein, an "item mask" refers to an image that segments the item featuring the specific pattern from one or more other regions of the image data (e.g., from a foreground of the image data, a background of the image data, one or more objects depicted in the image data, and so forth).

The image retexturing system finally receives one or more textures that are to be applied to the item depicted in the image data as featuring the specific pattern and the one or more textures are mapped to the mesh generated from the coordinates output by the regression module. The mesh with the one or more mapped textures is finally combined with the item mask and the shading layer to generate a synthesized image that depicts the item as retextured using the one or more textures, while retaining other visual properties of the original image data.

Advantageously, the systems and techniques described herein automatically generate a mesh for an item featuring a specific pattern in image data, independent of (e.g., without) user input, which is not possible using conventional approaches. Further, the described systems and techniques retain visual characteristics of an original image depicting the item featuring the specific pattern, such that a synthesized image depicting the retextured item maintains a visually realistic appearance, which is also not possible using conventional systems. By retaining a visually realistic appearance, the systems and techniques described herein are configured to generate synthesized images that do not appear to be synthesized (e.g., images that appear to represent image data that was captured by an image capturing device as would also be perceived by the human eye).

For instance, the systems and techniques advantageously are configured to modify only a portion of an image depicting an item featuring the specific pattern, without modifying other aspects depicted in the image, such as facial features and other visual aspects that are immediately recognizable by the human eye and are difficult for computers to synthetically reproduce. Although the described systems are configured to retain facial features and other visual aspects that are immediately perceived by the human eye, synthesized images depicted in the figures of this application intentionally depict human faces as blurred.

Furthermore, the described systems and techniques are extendable to video image data, and thus provide an accessible manner for generating synthesized image data that depicts an item featuring any number of different textures, which is not possible using conventional systems. As a further advantage relative to conventional systems, the described systems and techniques are configured to generate synthesized images by employing a series of modules that are individually trained to perform a corresponding task (e.g., a correspondence module trained to generate pixel correspondences for an item depicting a specific pattern in an input image, a regression module configured to generate a coordinate map for a surface of the item depicting the specific pattern based on the pixel correspondences, and a decomposition module configured to retain visual properties of an input image when generating a synthesized image depicting the item featuring a different pattern).

By individually training each module to perform its corresponding task and employing the modules in a series, the described systems and techniques generate synthesized images while consuming significantly fewer computational resources (e.g., processing power, network bandwidth, data storage, etc.) relative to conventional systems. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the pattern-guided coordinate mapping and digital image retexturing techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by an entity to perform operations "over the cloud" as described in FIG. 9.

The computing device 102 is depicted as including an image retexturing system 104. The image retexturing system 104 is implemented at least partially in hardware of the computing device 102 and implements an image composition model 106 to generate a synthesized image 108, based on an input image 110. The input image 110 is representative of image data depicting at least one item 112 featuring a specific pattern (e.g., pattern 114). In some implementations, the input image 110 further depicts one or more objects 116, such as an object upon which the item 112 featuring the pattern 114 is draped, placed, or otherwise disposed. For instance, in the illustrated example of FIG. 1, the at least one item 112 featuring the pattern 114 is an outfit and the object 116 is a person wearing the outfit. Specifically, the at least one item 112 depicted in the illustrated example of FIG. 1 is an outfit including a long-sleeved top, a vest, and a skirt that includes layered ruffles. In some implementations, the input image 110 represents data 118 maintained in storage 120 of the computing device 102.

Alternatively or additionally, in some implementations the input image 110 is obtained from a data storage location that is remote from the computing device 102, such as from a different computing device that is communicatively coupled to the computing device 102 via network 122. Although illustrated as being implemented locally at the computing device 102, functionality of the image retexturing system 104, the image composition model 106, or a combination thereof is configurable in whole or in part via functionality available via the network 122, such as part of a web service or "in the cloud."

As described in further detail below with respect to FIG. 2, the image composition model 106 is trained to generate coordinates that are useable to create a mesh defining a surface of the at least one item 112 featuring the pattern 114, as depicted in the input image 110. The pattern 114 refers to a known codec pattern of various geometries and colors that the image composition model 106 is trained to recognize, and is representative of any suitable codec pattern in accordance with the techniques described herein. The image composition model 106 is further representative of functionality of the image retexturing system 104 to generate a shading layer for the input image 110.

The shading layer refers to an image layer that represents the amount and distribution of light falling on the surface of the item 112 featuring the pattern 114, as depicted in the input image 110. Additionally, the image composition model 106 represents functionality of the image retexturing system 104 to generate an item mask for the input image 110, which segments the at least one item 112 from a remainder of the input image 110 (e.g., from the one or more objects 116, from a foreground of the input image 110, and from a background of the input image 110). By generating a shading layer and an item mask for the input image 110, the image retexturing system 104 is configured to generate a synthesized image 108 that depicts the at least one item 112 as featuring one or more different textures 124, while retaining visual characteristics of the at least one item 112 (e.g., other than the texture of the pattern 114).

The image retexturing system 104 is configured to receive input defining the one or more different textures 124 in any suitable manner. For instance, in some implementations the image retexturing system 104 displays controls in a user interface 126 that are selectable to apply one or more one or more different textures 124 to a portion or an entirety of the at least one item 112, as described in further detail below with respect to FIG. 7. In some implementations, the image retexturing system 104 is configured to receive input defining multiple (e.g., different) textures 124 and generate a plurality of different synthesized images 108, where each synthesized image in the plurality of different synthesized images 108 depicts the at least one item 112 as featuring a corresponding one of the multiple textures 124.

The illustrated example of FIG. 1 depicts two examples of a synthesized image 108 generated from the input image 110—synthesized image 128 and synthesized image 130. The synthesized image 128 and the synthesized image 130 each depict the item 112 as retextured using multiple textures 124, where different textures are mapped to different portions of the item's 112 surface. Specifically, synthesized image 128 depicts a shirt portion of the outfit as featuring a black and white checkered texture 124, depicts a vest portion of the outfit as featuring a floral texture 124, depicts top and bottom ruffles of a skirt portion of the outfit as featuring a gold leaf texture 124, and depicts a middle ruffle of the skirt portion as featuring a trapezoidal texture 124.

The synthesized image 130 depicts the shirt portion of the outfit as featuring a blue texture 124, depicts the vest portion of the outfit as featuring the gold leaf texture 124, and depicts each ruffle of the skirt portion as featuring a different floral texture 124. As depicted in each of the synthesized image 128 and the synthesized image 130, a remainder of the input image 110 remains unchanged, such that shading characteristics and other visual characteristics of the input image 110 are preserved in the synthesized image 128 and the synthesized image 130. As described in further detail below, this generation of the synthesized image 108 is performed independent of (e.g., without) requiring a human expert to create, or guide creation of, a mesh representing a surface of the at least one item 112 to be retextured. Furthermore, the synthesized image 108 is generated in a manner that preserves visual characteristics of the input image 110 without creating artifacts or other visual aspects that degrade from a realistic appearance of the synthesized image 108—specifically the at least one item 112 retextured using one or more different textures 124. These advantages provided by the image retexturing system 104 and techniques described herein are not possible using conventional techniques that rely on a human expert to manually create visually realistic synthesized images.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Item Retexturing Using Pattern-Guided Coordinate Mapping

The following describes pattern-guided coordinate mapping and digital image retexturing techniques in the context of algorithmic procedures that are implementable using systems and devices described herein. Aspects of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7 and in parallel to the procedure 800 of FIG. 8.

Figure 2:
FIG. 2 depicts a system in an example implementation showing operation of an image retexturing system of FIG. 1 in greater detail.

FIG. 2 depicts a system 200 in an example implementation showing operation of the image composition model 106 of FIG. 1 generating a synthesized image 108 which depicts an item 112 retextured to feature one or more textures 124. To begin, the image composition model 106 receives an input image 110 depicting an item 112 featuring a pattern 114 (block 802). In implementations, the input image 110 is representative of image data that includes a single, still image depicting the at least one item 112 featuring the pattern 114. Alternatively or additionally, in some implementations the input image 110 is representative of video image data that includes multiple frames depicting the at least one item 112 featuring the pattern 114, such that playback of the video image data depicts the at least one item 112 and/or other visual aspects of the input image 110 in motion. In the context of the following description, the input image 110 is configured as a single, still image depicting the at least one item 112 featuring the pattern 114.

The input image 110 is provided to a correspondence module 202, which represents functionality of the image composition model 106 to output discrete pixel correspondences 204. The pixel correspondences 204 are representative of information describing how different regions (e.g., different pixels) of the input image 110 correspond to a two-dimensional image of the pattern 114 that the correspondence module 202 is trained to recognize. In implementations, training the correspondence module 202 to identify different regions in the two-dimensional image of the pattern 114 involves various steps such as feature detection, feature description, and feature matching. In accordance with the techniques described herein, various algorithms can be implemented by the correspondence module 202 for each of the various steps (e.g., feature detection, feature description, and feature matching) to generate the pixel correspondences 204.

For example, the correspondence module 202 is trained to perform feature detection by identifying points of interest in the input image 110 (e.g., identifying points, such as pixels, in the input image 110 that depict at least a portion of the pattern 114). By virtue of being a known codec pattern, the pattern 114 is useable by the correspondence module 202 to identify unique and describable characteristics of the pattern 114 that differentiate the pattern 114 from other image data depicted in the input image 110. To do so, the correspondence module 202 is configured to implement a known feature detector, such as a Harris Corner detector, a Scale-Invariant Feature Transform (SIFT) detector, a Speeded-Up Robust Features (SURF) detector, and the like. As a specific example, in an implementation where the correspondence module 202 implements a SIFT detector, the SIFT detector detects key points of the pattern 114 depicted in the input image 110 at different scales and orientations. By detecting key points of the pattern 114 at different scales and orientations, the correspondence module 202 enables generation of a synthesized image 108 even when an input image 110 depicts the pattern 114 at different scales and orientations than a two-dimensional image of the pattern 114 that the correspondence module 202 is trained to recognize.

After detecting key points in the input image 110 (e.g., pixels in the input image 110 that depict at least a portion of the pattern 114), the correspondence module 202 performs feature description to allow for comparison between pixels of the input image 110 and a known two-dimensional image of the pattern 114. To do so, the correspondence module 202 represents key points of the pattern 114 as depicted in the input image 110 based on a local region for the key point in the input image 110. In implementations, the correspondence module 202 generates this representation of key points of the pattern 114 in the form of a feature descriptor or a feature vector. To do so, the correspondence module 202 leverages a known feature descriptor such as a SIFT descriptor, a SURF descriptor, a Binary Robust Independent Elementary Features (BRIEF) descriptor, an Oriented FAST and Rotated BRIEF (ORB) descriptor, and so forth.

After describing key points of the pattern 114 depicted in the input image 110 as a feature descriptor or a feature vector, the correspondence module 202 identifies similar features in a two-dimensional image of the pattern 114 (not depicted in the illustrated example of FIG. 2). The two-dimensional image of the 114 is representative of the pattern 114 featured on a smooth surface and serves as a ground truth reference for the pattern 114 as featured on the at least one item 112 depicted in the input image 110. In implementations, the correspondence module 202 performs feature matching using known methods such as Brute-Force matching, Fast Library for Approximate Nearest Neighbors (FLANN) matching, or other matching algorithms. In some implementations, the correspondence module 202 measures similarities between feature descriptors for the pattern 114 depicted in the input image 110 and a two-dimensional reference image of the pattern 114 using distance metric such as Euclidean distance.

Figure 3:
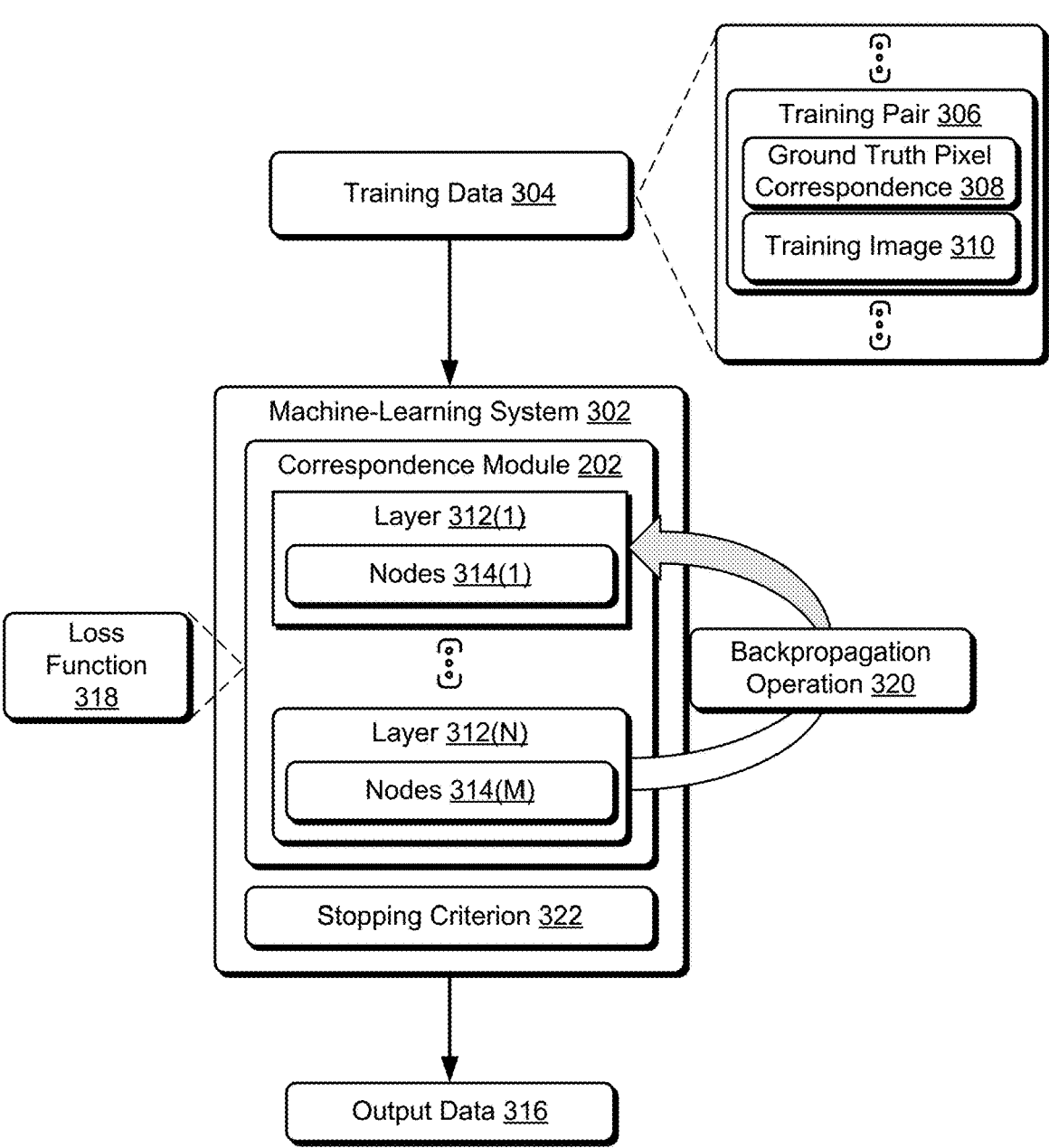
FIG. 3 depicts a system in an example implementation showing training of a correspondence module implemented by the image retexturing system of FIG. 1 in greater detail.

For a further description of training the correspondence module 202 to generate pixel correspondences 204 for the input image 110, consider FIG. 3.

FIG. 3 depicts a system 300 in an example implementation showing training of the correspondence module 202 implemented by the image composition module 106 in greater detail. The correspondence module 202 is illustrated as implemented as part of a machine-learning system 302. The machine-learning system 302 is representative of functionality to generate training data 304, use the generated training data 304 to train the correspondence module 202, and/or use the trained correspondence module 202 as implementing the functionality described herein. In the context of the correspondence module 202, the training data 304 is representative of a plurality of training pairs, where an individual training pair is depicted as training pair 306 in the illustrated example of FIG. 3. Each training pair 306 includes a ground truth pixel correspondence 308 for a corresponding training image 310. The ground truth pixel correspondence 308 is representative of information describing known correspondences between different regions (e.g., different pixels) of the training image 310 and a two-dimensional image of the pattern 114 that the correspondence module 202 is trained to recognize.

As described herein, the correspondence module 202 is representative of a machine-learning model, which refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, and so forth.

In the illustrated example of FIG. 3, the correspondence module 202 is a machine-learning model configured using a plurality of layers 312(1), . . . , 312(N) having, respectively, a plurality of nodes 314(1), . . . , 314(M), where N and M each represent any suitable integer. The plurality of layers 312(1)-312(N) are configurable to include an input layer, an output layer, and one or more hidden layers. Calculations are performed by the nodes 314(1)-314(M) within the layers via hidden states through a system of weighted connections that are "learned" during training of the correspondence module 202 to output a prediction of pixel correspondences for each training image 310 (e.g., a prediction of how each pixel of the training image 310 corresponds to a two-dimensional image of the pattern 114).

As noted above, to train the correspondence module 202, training data 304 is received that provides examples of "what is to be learned" by the correspondence module 202 (i.e., as a basis to learn how discrete regions of images depicting an item 112 featuring a pattern 114 correspond to a known two-dimensional image of the pattern 114). The machine-learning system 302, for instance, collects and preprocesses the training data 304 that includes input features and corresponding target labels, i.e., of what is exhibited by the input features. The machine learning system 302 then initializes parameters of the correspondence module 202, which are used by the correspondence module 202 as internal variables to represent and process information during training and represent inferences gained through training. In an implementation, the training data 304 is separated into batches (e.g., separate batches of training pairs 306) to improve processing and optimization efficiency of the parameters of the correspondence module 202 during training.

During training, a training image 310 is input to the correspondence module 202 and used by the correspondence module 202 to predict correspondences between a pattern 114 depicted in the image (e.g., on an item 112 depicted in the image) and a known two-dimensional image of the pattern 114. The prediction of pixel correspondences made by the correspondence module for the training image 310 is based on a current state of parameters of layers 312(1)-312(N) and corresponding nodes 314(1)-314(M), where the predicted pixel correspondences are represented as output data 316. Output data 316 is thus representative of an outcome of the pixel correspondence classification objective with which the correspondence module 202 is tasked (e.g., a probability of each pixel in the training image 310 corresponding to a region of the pattern 114 that the correspondence module 202 is trained to recognize).

Training of the correspondence module 202 includes calculating a loss function 318 to quantify a loss associated with operations performed by nodes of the correspondence module 202. Calculating the loss function 318, for instance, includes comparing a difference between predictions specified in the output data 316 and the ground truth pixel correspondence 308 for the training image 310 from which the output data 316 was generated. The loss function 318 is configurable in a variety of ways, examples of which include regret, Quadratic loss function as part of a least squares technique, and so forth.

Calculating the loss function 318 also includes use of a backpropagation operation 320 as part of minimizing the loss function 318 and thereby training parameters of the correspondence module 202. Minimizing the loss function 318, for instance, includes adjusting weights of the nodes 312(1)-312(M) in order to minimize the loss and thereby optimize performance of the correspondence module 202. The adjustment is determined by computing a gradient of the loss function 318, which indicates a direction to be used in order to adjust the parameters to minimize the loss. The parameters of the correspondence module 202 are then updated based on the computed gradient.

This process of training the correspondence module 202 continues over a plurality of iterations in an example until satisfying one or more stopping criterion 322. The stopping criterion 322 is employed by the machine-learning system 302 in this example to reduce overfitting of the correspondence module 202, reduce computational resource consumption, and promote an ability of the correspondence module 202 to address previously unseen data (e.g., data that is not included specifically as an example in the training data 304). Examples of a stopping criterion 322 include but are not limited to a predefined number of epochs, validation loss stabilization, achievement of a performance improvement threshold, or based on performance metrics such as precision and recall.

Returning to FIG. 2, the resulting pixel correspondences 204 generated by the correspondence module 202 are thus representative of a set of matched pairs of key points between the pattern 114 as depicted in the input image 110 and a ground truth reference image of the pattern 114. In implementations where the input image 110 depicts the pattern 114 as featured on a smooth, non-occluded surface of the at least one item 112, the pixel correspondences 204 are sufficient to use as a basis for generating a mesh representing the surface of the at least one item 112. However, to account for scenarios where the at least one item 112 featuring the pattern 114 includes wrinkles, folds, layers, or other characteristics that visually occlude one or more regions of the pattern 114, the image composition model 106 implements a regression module 206 to establish per-pixel correspondences between an image data space of the input image 110 and a coordinate space.

The regression module 206 represents functionality of the image composition model 106 to generate UV coordinates 208 for a surface of the at least one item 112 featuring the pattern 114 (block 804). As described herein, "UV coordinates" refer to axes in two-dimensional space, conventionally labeled as "U" and "V" to differentiate from the conventional X, Y, and Z axes modeling three-dimensional space. UV mapping allows transposing a two-dimensional image of a texture (e.g., of one or more different textures 124) to a mesh representing a three-dimensional object (e.g., a mesh representing a surface of the at least one item 112 featuring the pattern 114). The UV coordinates 208 correspond to specific points on the surface of the at least one item 112 featuring the pattern 114, defining how the one or more different textures 124 should cover the surface of the at least one item 112.

To generate the UV coordinates 208, the regression module 206 implements a multilayer perceptron (MLP) tasked with a regression objective to establish per-pixel correspondences between an image data space for the input image 110 and a coordinate parameterization space (e.g., a UV coordinate space). The MLP implemented by the regression module 206 refers to a neural network with at least three layers of nodes (e.g., an input layer, one or more hidden layers, and an output layer). Given the pixel correspondences 204 as input, the MLP is tasked with an objective to output, for each pixel in the input image 110 depicting the pattern 114, a pair of UV coordinates for a surface of the at least one item 112 featuring the pattern 114. The pairs of UV coordinates for each pixel in the input image 110 depicting the pattern 114 are represented as the UV coordinates 208 in the illustrated example of FIG. 2.

The MLP implemented by the regression module 206 is tasked with generating the UV coordinates 208 according to Equation 1:

$$(u, v) = f\left(x, y \mid \sum\right) \quad \text{(Eq. 1)}$$

In Equation 1, $\Sigma$ represents the pixel correspondences 204 (i.e., $\Sigma = \{(x_i, y_i) \mapsto (u_i, v_i)\}_{i=1, 2, \ldots, N}$, for each of N pixels in the input image 110 identified as depicting at least a portion of the pattern 114. In implementations, the regression module 206 adopts Random Fourier Features (e.g., $\gamma(x, y): \mathbb{R}^2 \mapsto \mathbb{R}^{712}$) to learn high frequency coordinate signals in the two-dimensional image domain, as described by Tanick et al. in "Fourier Features let networks learn high frequency functions in low dimensional domains," NeurIPS, 2020, the disclosure of which is hereby incorporated by reference.

During generation of the UV coordinates 208, the MLP implemented by the regression module 206 is guided using a data loss, $\mathcal{L}_{data}$, as described by Equation 2:

$$\mathcal{L}_{data} = \sum_{i=1}^{N} |(u_i, v_i) - f(\gamma(x_i, y_i))| \qquad \text{(Eq. 2)}$$

The MLP implemented by the regression module 206 is inherently C° continuous, such that the MLP's activation function and the connections between the input layer, hidden layer(s), and output layer are continuous everywhere (e.g., there are no sudden discontinuities or sharp transitions in the MLP's output as the inputs change). Accordingly, the mapping generated by the regression module 206 from the input image 110 image data space to the UV coordinate space is guaranteed to be smooth. However, due to wrinkles, overlapped layers, self-occlusion, and other characteristics that depict the surface of the at least one item 112 featuring the pattern 114 as non-smooth, UV coordinates 208 may have sudden changes in neighboring pixels of an image plane. Although the pixel correspondences 204 robustly and densely cover an entire area of the at least one item 112 featuring the pattern 114 as depicted in the input image 110, in implementations the pixel correspondences 204 are relatively sparse compared to a pixel resolution of the input image 110.

This sparsity is particularly severe in implementations where occlusion of the pattern 114 causes uncertain pixel correspondences 204 due to pattern 114 distortions, shadows in the input image 110, and other visual aspects that make it difficult to distinguish boundaries of the codec pattern from other portions of image data. Because smoothing pixel transitions between neighboring pixel correspondences 204 would result in visually discernable artifacts in the synthesized image 108, and thus a visually unappealing image, the regression module 206 tasks the MLP with minimizing changes to neighboring pixel correspondences 204 using a sparsity loss, $\mathcal{L}_{sparsity}$, as described by Equation 3:

$$\mathcal{L}_{sparsity} = \sum_{(x,y)\in\Theta} |\max(\det(J_f(x, y)), k|_0. \qquad \text{(Eq. 3)}$$

The absolute value of the Jacobian determinant, J, of f at point (x, y) provides a factor by which the mapping f expands or shrinks a local area around (x, y). In Equation 3, $\Theta$ represents pixels near the seams (e.g., pixels whose nearest four corners are not next to each other in the two-dimensional ground truth image of the pattern 114, and k represents a threshold to regularize the range of the Jacobian. In implementations where the image data space and the UV coordinate system are equivalent in scale (e.g., a flat surface depicting the pattern 114 is facing an image capture device such as a camera or a video camera), $J_f$ is equal to one (e.g., there is no stretching or shrinking of the depicted pattern 114). To account for variation and distortion, in some implementations the sparsity loss is generated with k=1.5, to focus on areas around seams in the pixel correspondences 204. In such implementations, the sparsity loss with k=1.5 causes the MLP to focus on unknown pixels in the pixel correspondences 204 using a surrounding region of less than two pixels (e.g., a radius of less than two pixels from the unknown pixel in the pixel correspondences 204).

In implementations, a total loss function for the MLP used to generate the UV coordinates 208 is represented as $\mathcal{L}_{image} = \mathcal{L}_{data} + \lambda_{sparsity} \mathcal{L}_{sparsity}$, where $\lambda$sparsity represents a weight balancing the data and sparsity losses. The total loss thus encourages the MLP implemented by the regression module 206 to output UV coordinates 208 based on the pixel correspondences 204 in a manner that changes as little as possible, as rapidly as possible (e.g., in a computationally efficient manner that minimally distorts visual characteristics of the input image 110), while biasing away from the MLP's inherent tendency to favor smoothness and accurately handle discontinuities in a UV mapping. For a further description of training the regression module 206 (e.g., of training the MLP implemented by the regression module 206), consider FIG. 4.

Figure 4:
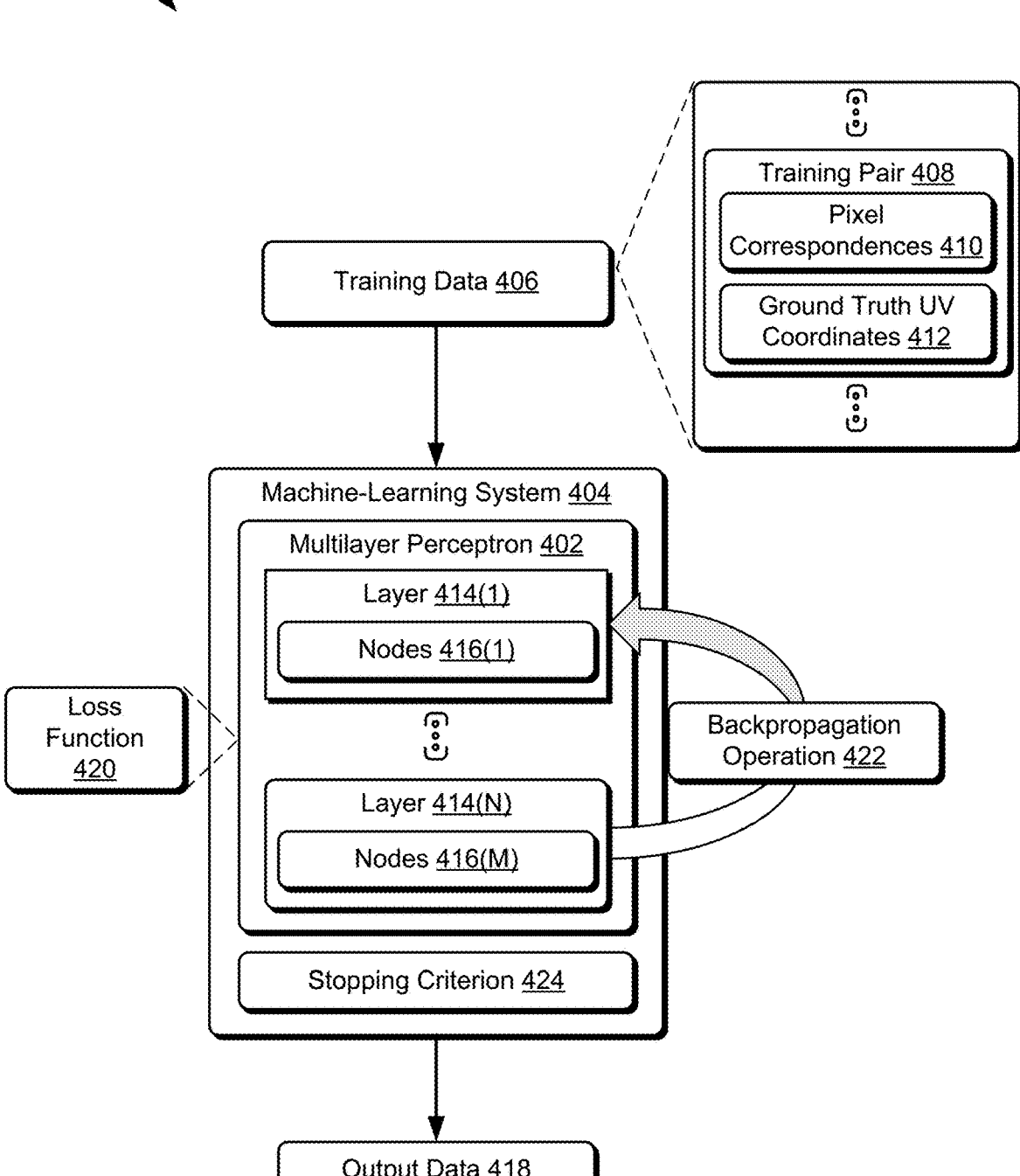
FIG. 4 depicts a system 400 in an example implementation showing training of a multilayer perceptron implemented by the image retexturing system of FIG. 1 in greater detail.

FIG. 4 depicts a system 400 in an example implementation showing training of the regression module 206 (e.g., of training the MLP implemented by the regression module 206) implemented by the image composition module 106 in greater detail. The multilayer perceptron (MLP 402) is illustrated as implemented as part of a machine-learning system 404. The machine-learning system 404 is representative of functionality to generate training data 406, use the generated training data 406 to train the MLP 402, and/or use the trained MLP 402 as implementing the functionality described herein. In the context of the MLP 402, the training data 406 is representative of a plurality of training pairs, where an individual training pair is depicted as training pair 408 in the illustrated example of FIG. 4. Each training pair 408 includes pixel correspondences 410 (e.g., pixel correspondences 204 output by the correspondence module 202) and corresponding ground truth UV coordinates 412 for the pixel correspondences 410. 308 for a corresponding training image 310. The ground truth UV coordinates 412 are representative of information describing known UV coordinates for the pixel correspondences 410 (e.g., a known mesh that defines one or more surfaces of at least one item 112 featuring the pattern 114 in an image from which the pixel correspondences 410 were generated).

As described herein, the MLP 402 is representative of a machine-learning model. In the illustrated example of FIG. 4, the MLP 402 a machine-learning model configured using a plurality of layers 414(1), . . . , 414(N) having, respectively, a plurality of nodes 416(1), . . . , 416(M), where N and M each represent any suitable integer. The plurality of layers 414(1)-414(N) are configurable to include an input layer, an output layer, and one or more hidden layers. Calculations are performed by the nodes 416(1)-416(M) within the layers via hidden states through a system of weighted connections that are "learned" during training of the MLP 402 to output a prediction of a UV coordinate map for an instance of pixel correspondences 410 included in a training pair 408.

As noted above, to train the MLP 402, training data 406 is received that provides examples of "what is to be learned" by the MLP 402 (i.e., as a basis to learn how pixel correspondences 410 output by the correspondence module 202 correspond to a UV coordinate map). The machine-learning system 404, for instance, collects and preprocesses the training pair 408 that includes input features and corresponding target labels, i.e., of what is exhibited by the input features. The machine learning system 404 then initializes parameters of the MLP 402, which are used by the MLP 402 as internal variables to represent and process information during training and represent inferences gained through training. In an implementation, the training data 406 is separated into batches (e.g., separate batches of training pairs 408) to improve processing and optimization efficiency of the parameters of MLP 402 during training.

During training, an instance of the pixel correspondences 410 is input to the MLP 402 and used by the MLP 402 to predict UV coordinates (e.g., a mesh that defines one or more surfaces of at least one item 112 featuring the pattern 114 in an image from which the pixel correspondences 410 were generated). The prediction of the UV coordinates made by the MLP 402 for a training pair 408 is based on a current state of parameters of layers 414(1)-414(N) and corresponding nodes 416(1)-416(M), where the predicted UV coordinates are represented as output data 418. Output data 418 is thus representative of an outcome of the regression objective with which the MLP 402 is tasked to establish per-pixel correspondences between an image data space for an input image and a coordinate parameterization space (e.g., a UV coordinate space).

As noted above, training the MLP 402 includes calculating a loss function 420 to quantify a loss associated with operations performed by nodes of the MLP 402. Calculating the loss function 420, for instance, includes comparing a difference between predictions specified in the output data 418 and the ground truth UV coordinates 412 of the training pair from which the output data 418 was generated. The loss function 420 is thus representative of $\mathcal{L}_{image}$, as described above.

Calculating the loss function 420 also includes use of a backpropagation operation 422 as part of minimizing the loss function 420 and thereby training parameters of the MLP 402. Minimizing the loss function 420, for instance, includes adjusting weights of the nodes 416(1)-416(M) in order to minimize the loss and thereby optimize performance of the MLP 402. The adjustment is determined by computing a gradient of the loss function 420, which indicates a direction to be used in order to adjust the parameters to minimize the loss. The parameters of the MLP 402 are then updated based on the computed gradient.

This process of training the MLP 402 continues over a plurality of iterations in an example until satisfying one or more stopping criterion 424. The stopping criterion 424 is employed by the machine-learning system 404 in this example to reduce overfitting of the MLP 402, reduce computational resource consumption, and promote an ability of the MLP 402 to address previously unseen data (e.g., data that is not included specifically as an example in the training data 406). Examples of a stopping criterion 424 include but are not limited to a predefined number of epochs, validation loss stabilization, achievement of a performance improvement threshold, or based on performance metrics such as precision and recall.

Returning to FIG. 2, the UV coordinates 208 output by the regression module 206 are thus representative of a mesh that defines one or more surfaces of the at least one item 112 featuring the pattern 114 in the input image 110.

FIG. 5 depicts an example 500 of UV coordinates 208 generated for a surface of the at least one item 112 featuring the pattern 114 as depicted in the input image 110. For instance, in the illustrated example 500, the pattern 114 is first processed by the correspondence module 202 to generate pixel correspondences 204, which is represented as coarse correspondence 502. The coarse correspondence 502 represents a coarse mapping between pixels of the input image 110 depicting at least a portion of the pattern 114 and a reference (e.g., ground truth) two-dimensional image of the pattern 114. As depicted in FIG. 5, the coarse correspondence 502 includes multiple unknown pixels, where UV coordinate changes caused by heavy wrinkles in the clothing item featuring the pattern 114, self-occlusion due to a manner in which the clothing item featuring the 114 overlaps itself, shading in the input image 110, makes it difficult for the correspondence module 202 to determine pixel correspondences 204 for the unknown pixels.

The coarse correspondence 502 is then processed by the regression module 206 to generate a regressed correspondence 504, which represents an estimation by the regression module 206 (e.g., by the MLP implemented by the regression module 206) of a UV coordinate pair for each unknown pixel in the coarse correspondence 502 (e.g., a mapping of each unknown pixel to a corresponding region in the reference (e.g., ground truth) two-dimensional image of the pattern 114. The regressed correspondence 504 is thus representative of the UV coordinates 208 output by the regression module 206 for each pixel in the input image 110 depicting at least a portion of the pattern 114.

Given the UV coordinates 208, the surface(s) of the at least one item 112 featuring the pattern 114 can be segmented into one or more regions, as represented by the item segmentation 506, where different portions of a clothing item are associated with different regions based on their corresponding UV coordinates. In this manner, the at least one item 112 can be segmented into discrete regions, such that one or more different textures 124 can be mapped to each discrete region when generating the synthesized image 108. For instance, in the illustrated example of FIG. 5, the item segmentation 506 segments the clothing item worn by the model in to generally square regions that each correlate to different layers as evidenced by the input image 110 depicted in FIG. 1, such that different textures can be applied to the different regions. Detailed view 508 provides a zoomed-in view of a portion of the item segmentation 506 to demonstrate a granularity with which different regions of the at least one item 112 can be segmented. In accordance with the techniques described herein, the item segmentation 506 can segment the at least one item 112 on a per-pixel basis, such that different textures 124 can be mapped to specific pixels depicting the at least one item 112 in the synthesized image 108.

Returning to FIG. 2, the image composition model 106 additionally leverages a decomposition module 210, which represents functionality of the image composition model 106 to generate an item mask and a shading layer for the input image 110. Specifically, the decomposition module 210 includes a masking model 212 that is configured to generate an item mask 216 for the 110 (block 806). The item mask 216 represents data that segments one or more portions, or an entirety, of the at least one item 112 featuring the pattern 114 from a remainder of the input image 110 (e.g., from portions of the input image 110 that do not depict the pattern 114). In some implementations, generation of the item mask 216 is guided by inputting the UV coordinates 208 to the masking model 212, thus informing the masking model 212 of one or more regions in the input image 110 that are detected to depict the at least one item 112 featuring the pattern 114.

In implementations, the masking model 212 is configured as a U-Net convolutional neural network (CNN) architecture, with an encoder and a decoder. The encoder captures the context of the input image 110 using a series of convolutional and max pooling layers. Convolution layers help extract features from the input image 110, while max pooling reduces the dimensionality of the input image 110, allowing the masking model 212 to focus on the more important features (e.g., pixels depicting at least a portion of the pattern 114). The decoder gradually upsamples feature maps produced by the encoder portion to restore an output (e.g., the item mask 216) to a size of the input image 110 from the encoder to restore the image to its original size, allowing the network to keep the spatial information intact.

The item mask 216 is thus a binary image that consists of pixel values of either one or zero, where a pixel with a value of 1 (often represented in white) indicates that the corresponding pixel in the image is part of the region of interest (e.g., pixels of the input image 110 that do not depict the pattern 114 and are to be preserved in the synthesized image 108). Conversely, in the item mask 216, a pixel with a value of 0 (often represented in black) indicates that the corresponding pixel in the image is not part of the region of interest (e.g., pixels of the input image 110 that depict at least a portion of the pattern 114 and will be retextured using the UV coordinates 208).

The decomposition module 210 additionally includes a shading model 214 that is configured to generate a shading layer 218 for the input image 110 (block 808). In the context of digital images, the shading layer 218 refers to an image layer that represents and amount and distribution of light falling on a surface of the at least one item 112 featuring the pattern 114. The shading layer 218 captures how surfaces of the at least one item 112 featuring the pattern 114 in the input image 110 are illuminated and shadowed, thereby providing depth and a sense of three-dimensionality when perceived by the human eye.

The shading layer 218 does not account for actual colors or textures of one or more objects 116 depicted in the input image 110, but rather how light interacts with the one or more objects 116 and the at least one item 112. In this manner, the shading layer 218 represents information describing at least one light-source direction, intensity, and the interaction of light with the surface properties of depicted objects and items in the input image 110 (e.g., material characteristics, roughness, depth, and so forth).

In some implementations, the shading model 214 generates the shading layer 218 using the same U-Net CNN architecture as leveraged by the masking model 212 to generate the item mask 216, such as described by Ronneberger, et al. in "International Conference on Medical image computing and computer-assisted intervention," Springer, 2015, the disclosure of which is hereby incorporated by reference.

The image composition model 106 additionally implements a composition module 220, which is configured to receive at least one texture 124 to be applied to the at least one item 112 (block 810), such as via input to a user interface 126 of the image retexturing system 104, as described in further detail below with respect to FIG. 7. Given the texture(s) 124, the UV coordinates 208, the item mask 216, and the shading layer 218, the composition module 220 generates a synthesized image 108 that depicts the at least one item 112 as featuring the texture(s) 124 (block 812).

Figure 6:
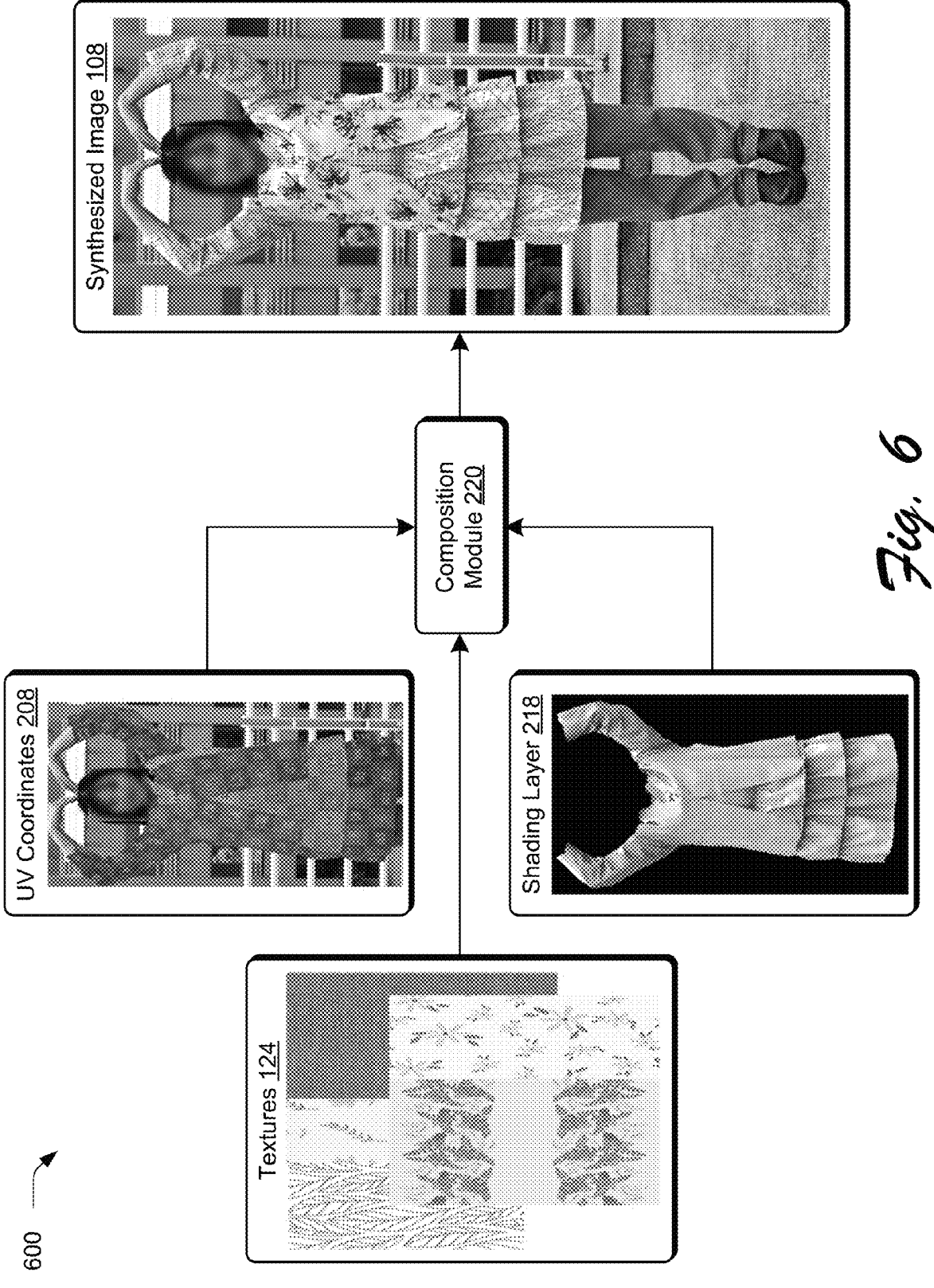
FIG. 6 depicts an example implementation of the image retexturing system of FIG. 1 generating a synthesized image that depicts a retextured item featuring one or more textures.

For instance, FIG. 6 depicts an example 600 demonstrating how the composition module 220 generates a synthesized image 108 given UV coordinates 208, the shading layer 218, the item mask 216 (not depicted), and different textures one or more different textures 124.

Although described above in the context of generating a synthesized image 108 for a single input image 110 (e.g., a still image), the image composition model 106 is further configured to generate a synthesized image 108 for each frame of a video that depicts the at least one item 112 featuring the pattern 114.

In implementations where the input image 110 represents a video comprising multiple frames, the image composition model 106 is configured to leverage a temporal consistency loss to ensure a visually coherent appearance of the retextured item during playback of a video including synthesized image 108 frames. The temporal consistency loss is applied to the MLP implemented by the regression module 206, and is defined as $\mathcal{L}_{temp}$ in Equation 4:

$$\mathcal{L}_{temp} = \sum_{\substack{i=1,2,\ldots,K-1 \\ (x,y)\in M_i}} |f(x, y) - f(w_i^{i+1}(x, y)| \qquad \text{(Eq. 4)}$$

In Equation 4, M represents the item mask 216, K represents the number of video frames in the input image data, and $w_i^{i+1}$ represents an optical flow predicted by an estimator, such as the estimators described by Jiang, et al. in "Learning optical flow from a few matches", In Proceedings of the IEEE/CVF Conference on Computer Vision and Pattern Recognition, and Teed, et al. in "Raft: Recurrent all-pairs field transforms for optical flow," Springer, 2020, the disclosures of which are hereby incorporated by reference. The optical flow-based consistency loss of Equation 4 is thus used to address temporal consistency issues at areas near seams in the pixel correspondences 204, where UV coordinates are not continuous and pixel correspondence detection may fail, as described by Ye, et al. in "Deformable Sprites for unsupervised video decomposition," In Proceedings of the IEEE/CVF Conference on Computer Vision and Pattern Recognition, and Kasten, et al. in "Layered neural atlases for consistent video editing, ACM Transactions on Graphics, the disclosures of which are hereby incorporated by reference.

The total loss function for generating synthesized images 108 for video frames depicting the at least one item 112 featuring the pattern 114 is thus represented as $\mathcal{L}_{video} = \mathcal{L}_{data} + \lambda_{sparsity}\mathcal{L}_{sparsity} + \lambda_{temp}\mathcal{L}_{temp}$, where $\lambda_{temp}$ represents a weight for the temporal consistency loss term. In some implementations, generating synthesized images 108 for video frames further involves training the MLP leveraged by the regression module 206 in a fine-tuned manner (e.g., when working on frame i, the MLP is initialized by the result of frame i−1), which aids convergence and maintains temporal consistencies from adjacent (e.g., sequential) frames).

Figure 7:
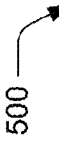
FIG. 7 depicts an example user interface of the image retexturing system of FIG. 1.

FIG. 7 depicts an example 700 of a user interface 126 output by the image retexturing system 104 as part of generating a synthesized image 108 in accordance with the techniques described herein. In the example 700, the user interface 126 includes a display of different textures 124 to be applied to the at least one item 112. Specifically, the user interface 126 includes a first texture 702, a second texture 704, a third texture 706, a fourth texture 708, and a fifth texture 710. The example 700 represents an instance where the second texture 704 is selected in the user interface 126 for mapping to the at least one item 112, as indicated by the bold border surrounding the display of the second texture 704.

The user interface 126 depicted in the example 700 further includes controls that are selectable to map a selected texture to one or more regions of a at least one item 112. For instance, the user interface 126 includes control 712, which is selectable to apply a designated texture (e.g., the second texture 704) to one or more selected regions of the at least one item 112. In response to detecting input at control 712, the user interface 126 enables a user of the image retexturing system 104 to select one or more regions from an item segmentation 506 of the at least one item 112, such as the item segmentation 506 derived from the UV coordinates 208 described above with respect to FIG. 5. For instance, in response to receiving input selecting second texture 704 and input selecting control 712, subsequent input selecting one or more regions (e.g., pixels, groups of pixels, etc.) of the item segmentation 506 causes the second texture 704 to be applied to the selected region(s) in the item segmentation 506.

In this manner, the image retexturing system 104 enables for granular generation of a synthesized image 108, where discrete regions can be assigned different textures 124. Alternatively, in response to detecting input at control 714, the composition module 220 applies the selected texture (e.g., second texture 704) to an entirety of the at least one item 112 for output in the synthesized image 108. Thus, the image retexturing system 104 provides an accessible, intuitive process for generating synthesized images 108 in a manner that is user-customizable, while maintaining visual fidelity to an input image 110 depicting an item featuring a known, specific pattern.

Example System and Device

Figure 9:
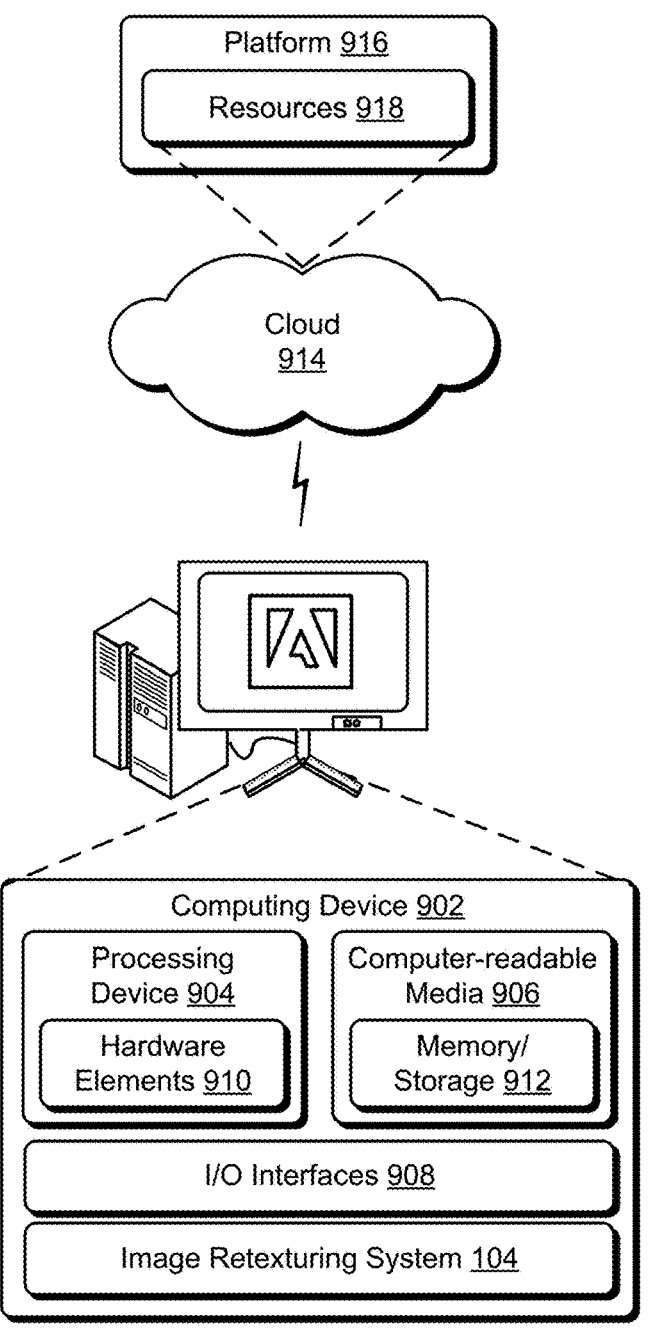
FIG. 9 illustrates an example system including various components of an example device that can be implemented as any type of computing device as described and/or utilized with reference to FIGS. 1-8 to implement the techniques described herein.

FIG. 9 illustrates an example system 900 that includes an example computing device 902 that is representative of one or more computing systems and/or devices that implement the various techniques described herein. This is illustrated through inclusion of the image retexturing system 104. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a computing device, an image depicting an item featuring a pattern;
generating, by the computing device, a coordinate map for the item based on the pattern by inputting the image to a multilayer perceptron regression network and causing the multilayer perceptron regression network to generate a coarse mapping between pixels of the image and the pattern;
generating, by the computing device, an item mask that segments the item from a background of the image by processing the coordinate map and the image using a trained masking model;
generating, by the computing device, a shading layer for the item as depicted in the image by processing the image using a trained shading model;
receiving, by the computing device, at least one texture to be applied to the item; and
generating, by the computing device, a synthesized image that depicts the item featuring the at least one texture using the coordinate map, the item mask, and the shading layer.

2. The method of claim 1, wherein the synthesized image depicts the item featuring the at least one texture and the background of the image.

3. The method of claim 1, wherein the item comprises an article of clothing that features the pattern on at least one surface of the article of clothing and the coordinate map comprises a mapping of pixels of the image to points on the at least one surface of the article of clothing.

4. The method of claim 1, wherein the multilayer perceptron regression network is trained to predict, for each pixel in the image depicting a portion of the pattern, a mapping between the pixel and a point in a two-dimensional image of the pattern.

5. The method of claim 4, wherein generating the coordinate map for the item comprises regressing the mapping between the pixels of the image and the pattern, using the multilayer perceptron regression network, to generate a dense mapping between the pixels of the image and the pattern with an objective of minimizing pixel value differences between an unknown pixel in the coarse mapping and pixels within a region surrounding the unknown pixel in the coarse mapping.

6. The method of claim 5, wherein the objective of minimizing pixel value differences between the unknown pixel in the coarse mapping and the pixels within the region surrounding the unknown pixel in the coarse mapping is performed using a sparsity loss.

7. The method of claim 5, wherein the region surrounding the unknown pixel in the coarse mapping is defined by a radius of less than two pixels relative to the unknown pixel in the coarse mapping.

8. The method of claim 5, wherein the coarse mapping between the pixels of the image and the pattern includes a plurality of unknown pixels that depict at least a portion of the pattern and are not mapped to a corresponding point in the two-dimensional image of the pattern.

9. The method of claim 8, wherein the dense mapping between the pixels of the image and the pattern maps each of the plurality of unknown pixels that depict at least a portion of the pattern to a corresponding point in the two-dimensional image of the pattern.

10. The method of claim 1, wherein the image comprises a frame of a plurality of frames in a video that depict the item featuring the pattern, wherein generating the coordinate map, generating item mask, generating the shading layer, and generating the synthesized image is performed for each of the plurality of frames in the video.

11. The method of claim 10, wherein generating the synthesized image for each of the plurality of frames in the video is performed using a temporal consistency loss to ensure that the plurality of frames in the video depict the item featuring the at least one texture with a coherent optical flow.

12. The method of claim 1, wherein receiving the at least one texture to be applied to the item comprises receiving multiple different textures and applying individual ones of the multiple different textures to respective different portions of the item.

13. The method of claim 12, further comprising displaying, at the computing device, a user interface that presents the multiple different textures and the coordinate map for the item, wherein applying individual ones of the multiple different textures to the respective different portions of the item is performed responsive to receiving input at the user interface designating one of the multiple different textures for application to one or more regions of the coordinate map.

14. A system comprising:
a memory component; and
a processing device coupled to the memory component, the processing device to perform operations comprising:
receiving a video comprising multiple frames that depict an item featuring a pattern;
generating, for each of the multiple frames, a coordinate map for the item using the pattern by inputting the video to a multilayer perceptron regression network and causing the multilayer perceptron regression network to generate a coarse mapping between pixels of a corresponding one of the multiple frames and the pattern;
generating, for each of the multiple frames, an item mask that distinguishes the item from other image data depicted in the frame by processing the coordinate map and the image using a trained masking model;
generating, for each of the multiple frames, a shading layer for the item as depicted in the frame by processing the image using a trained shading model;
receiving at least one texture to be featured by the item;
generating, for each of the multiple frames, a synthesized frame that depicts the item featuring the at least one texture using the coordinate map, the item mask, and the shading layer generated for the frame; and
outputting the multiple synthesized frames as a synthesized video that depicts the item featuring the at least one texture.

15. The system of claim 14, wherein each synthesized frame depicts the item featuring the at least one texture and at least a portion of image data depicted in a corresponding one of the multiple frames, wherein the at least the portion of image data comprises a background or an object depicted in the corresponding one of the multiple frames.

16. The system of claim 14, wherein the multilayer perceptron regression network is trained to predict, for each pixel in the corresponding one of the multiple frames depicting a portion of the pattern, a mapping between the pixel and a point in a two-dimensional image of the pattern.

17. The system of claim 14, wherein receiving the at least one texture to be applied to the item comprises receiving multiple different textures and applying individual ones of the multiple different textures to respective different portions of the item.

18. The system of claim 17, the operations further comprising displaying a user interface that presents the multiple different textures and the coordinate map for the item, wherein applying individual ones of the multiple different textures to the respective different portions of the item is performed responsive to receiving input at the user interface designating one of the multiple different textures for application to one or more regions of the coordinate map.

19. The system of claim 14, wherein generating the synthesized image for each of the multiple frames in the video is performed using a temporal consistency loss to ensure that the multiple frames in the video depict the item featuring the at least one texture with a coherent optical flow.

20. A non-transitory computer-readable medium storing executable instruction, which when executed by a processing device, cause the processing device to perform operations comprising:
receiving a first input at a user interface of an image depicting an item featuring a pattern;
generating, using an image composition model and based on the pattern:
a coordinate map for a surface of the item by processing the image using a correspondence module of the image composition model trained to generate pixel correspondences between the item featuring the pattern and a known two-dimensional image of the pattern and a regression module trained to generate a coordinate map by generating a coarse mapping between pixels of the image and the pattern, the coordinate map defining a surface of the item featuring the pattern;
an item mask that segments the item from a background of the image by processing the coordinate map and the image using a trained masking model; and
a shading layer that represents how lighting in the image interacts with the item by processing the image using a trained shading model;
receiving a second input at the user interface selecting at least one texture to be applied to the item;
receiving a third input at the user interface selecting one or more regions of the item to which the at least one texture is to be applied; and
generating a synthesized image that depicts the item featuring the at least one texture based on the second input and the third input.

* * * * *